United States Patent
Johnson et al.

(10) Patent No.: US 11,853,848 B2
(45) Date of Patent: Dec. 26, 2023

(54) BACKEND QUANTUM RUNTIMES

(71) Applicant: International Business Machines Corporation, Armonk, NY (US)

(72) Inventors: Blake Johnson, Ossining, NY (US); Ismael Faro Sertage, Chappaqua, NY (US); Lev Samuel Bishop, Dobbs Ferry, NY (US); Jay Michael Gambetta, Yorktown Heights, NY (US); Renier Morales, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 287 days.

(21) Appl. No.: 17/314,372

(22) Filed: May 7, 2021

(65) Prior Publication Data

US 2022/0358391 A1    Nov. 10, 2022

(51) Int. Cl.
*G06F 9/50*  (2006.01)
*G06N 10/80*  (2022.01)
*G06N 10/00*  (2022.01)
*G06F 15/16*  (2006.01)

(52) U.S. Cl.
CPC .............. *G06N 10/00* (2019.01); *G06F 15/16* (2013.01)

(58) Field of Classification Search
CPC ........ G06N 10/00; G06N 10/80; G06F 15/16; G06F 9/5044; G06F 9/5072; G06F 9/5077
See application file for complete search history.

(56) References Cited

U.S. PATENT DOCUMENTS

| | | | |
|---|---|---|---|
| 8,175,995 B2 | 5/2012 | Amin | |
| 10,484,479 B2 | 11/2019 | Johnson et al. | |
| 10,885,678 B2 * | 1/2021 | Bishop | G06T 1/20 |
| 10,956,830 B1 | 3/2021 | Rigetti et al. | |
| 11,245,519 B1 * | 2/2022 | Stapleton, Jr. | H04L 9/0858 |
| 2009/0182542 A9 | 7/2009 | Hilton et al. | |
| 2018/0246851 A1 | 8/2018 | Zaribafiyan et al. | |

(Continued)

FOREIGN PATENT DOCUMENTS

WO    2020047426 A1    3/2020

OTHER PUBLICATIONS

Peruzzo, A et al. | A variational eigenvalue solver on a photonic quantum processor. Nat Commun 5, 4213 (2014), 7 pages.

(Continued)

*Primary Examiner* — Nghia M Doan
(74) *Attorney, Agent, or Firm* — Amin, Turocy & Watson, LLP

(57) ABSTRACT

Systems and techniques that facilitate backend quantum runtimes are provided. In various embodiments, a system can comprise a backend receiver component that can access a computer program provided by a client device, wherein the computer program is configured to indicate a quantum computation. In various aspects, the system can further comprise a backend runtime manager component that can host the computer program by instantiating a backend classical computing resource. In various instances, the backend classical computing resource can orchestrate both classical execution of the computer program and quantum execution of the quantum computation indicated by the computer program.

20 Claims, 11 Drawing Sheets

(56) References Cited

U.S. PATENT DOCUMENTS

| | | |
|---|---|---|
| 2018/0260245 A1 | 9/2018 | Smith |
| 2019/0102220 A1* | 4/2019 | Bishop et al. |
| 2020/0026551 A1* | 1/2020 | Ducore ............... G06F 9/4843 |
| 2020/0160204 A1 | 5/2020 | Johnson et al. |
| 2022/0309371 A1* | 9/2022 | Singh ................... G06N 10/00 |

OTHER PUBLICATIONS

Farhi, E. et al. | arXiv:1411.4028 (2014), 16 pages.
Rigetti Computing | Website, qcs.rigetti.com.
Amazon EC2 | Web service, https://aws.amazon.com/ec2/?ec2-whats-new.sort-by=item.additionalFields.postDateTime&ec2-whats-new.sort-order=desc, last accessed on Apr. 30, 2021.
Amazon Quantum Solutions | https://aws.amazon.com/quantum-solutions-lab/, last accessed on May 5, 2021.
Microsoft Quantum | https://azure.microsoft.com/en-us/solutions/quantum-computing/, last accessed on May 5, 2021.
Google Quantum | https://quantumai.google/, last accessed on May 5, 2021.
Mell et al., "The NIST Definition of Cloud Computing," Recommendations of the National Institute of Standards and Technology, NIST Special Publication 800-145, Sep. 2011, 7 pages.
International Search Report and Written Opinion for International Application Serial No. PCT/EP2022/061770 dated Sep. 5, 2022, 13 pages.
Karalekas, P.J et al. | "A quantum-classical cloud platform optimized for variational hybrid algorithms." arXiv: 2001.04449v3 [quant-ph] May 31, 2020, 21 pages.
Nguyen, Th et al. | "Extending C++ for Heterogeneous Quantum-Classical Computing." arXiv:2010.03935v1 [quant-ph] Oct. 8, 2020, 27 pages.

* cited by examiner

BACKEND QUANTUM RUNTIMES

BACKGROUND

The subject disclosure relates to quantum computing, and more specifically to backend quantum runtimes that can efficiently offer quantum computing as a remote service.

The field of quantum computing has recently seen a growth of algorithms that utilize both classical processing and quantum processing. In other words, the execution of such classical-quantum algorithms can be facilitated by leveraging both classical computing resources and quantum computing resources. Although classical computing resources are widely available, quantum computing resources are not, since quantum computing is still in its nascency, and since the physical environments of existing quantum hardware must be meticulously controlled so as to maintain coherence and minimize detrimental noise effects. Accordingly, some industrial players that specialize in the construction and maintenance of quantum hardware offer quantum computing as a remote service. Thus, a client that desires to execute a classical-quantum algorithm can do so by leveraging such a remote quantum computing service.

An existing remote quantum computing service exhibits a division between classical computing resources and quantum computing resources, where the classical computing resources are located exclusively on the client-side, and where the quantum computing resources are located exclusively on the service-side. The present inventors realized that such a divided remote service architecture can exhibit poor performance due to high-latency interactions between the classical computing resources and the quantum computing resources. Thus, the present inventors have observed that systems and/or techniques that can address this technical problem can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate backend quantum runtimes are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a receiver component that can access a computer program provided by a client device. In various cases, the computer program can be configured to indicate a quantum computation. In various aspects, the computer-executable components can further comprise a backend runtime manager component that can host the computer program by instantiating a backend classical computing resource. In various cases, the backend classical computing resource can orchestrate both classical execution of the computer program and quantum execution of the quantum computation indicated by the computer program. In various instances, the system can further comprise at least one backend quantum computing device that can, in response to an instruction from the backend classical computing resource, execute the quantum computation indicated by the computer program.

According to one or more embodiments, the above-described system can be implemented as a computer-implemented method and/or computer program product.

DETAILED DESCRIPTION

Figure 1:
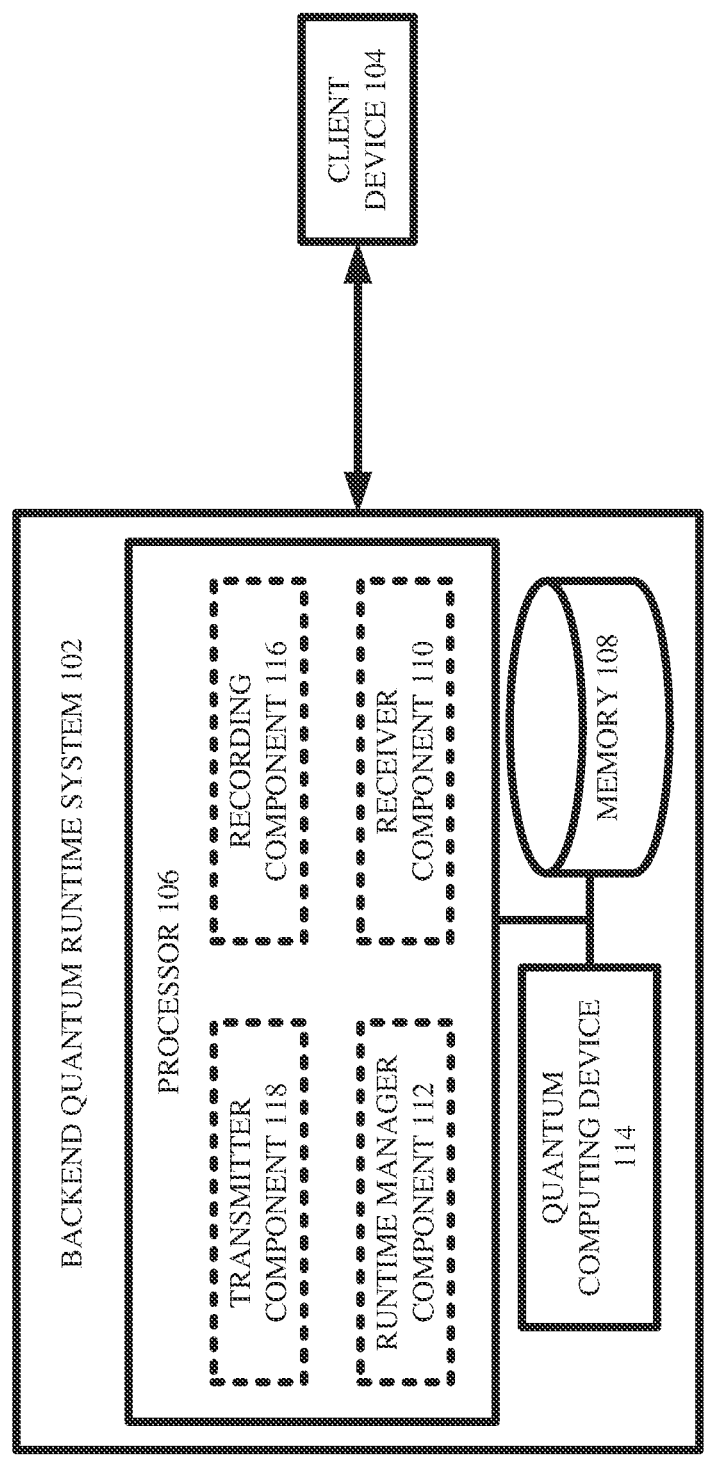
FIG. 1 illustrates a block diagram of an example, non-limiting system that facilitates backend quantum runtimes in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The field of quantum computing has recently seen a growth of algorithms that utilize both classical processing and quantum processing. That is, the execution of such classical-quantum algorithms can be facilitated by leveraging both classical computing resources (e.g., classical computers, which employ bits to represent and process information) and quantum computing resources (e.g., quantum computers and/or quantum hardware, which utilize qubits to represent and process information). For example, a classical-quantum algorithm can, in some cases, call for a quantum computation within a classical optimization loop (e.g., each iteration of the classical optimization loop can require the performance of a quantum computation). Non-limiting examples of such a classical-quantum algorithm can include the Variational Quantum Eigensolver (VQE) and the Quantum Approximate Optimization Algorithm (QAOA). Because classical computing resources cannot perform quantum computations, such a classical-quantum algorithm cannot be facilitated by classical computing resources alone. Instead, such a classical-quantum algorithm can be facilitated by classical computing resources that interact with quantum computing resources.

Classical computing resources are widely available (e.g., desktop computers, laptop computers, and/or smart phones are non-limiting examples of classical computing resources). In contrast, quantum computing resources are not yet widely available. This is due in part to quantum computing still being in its nascency. Indeed, existing quantum hardware (e.g., Noisy Intermediate-Scale Quantum hardware) is limited in the number of qubits that can be implemented and usually requires extensive error correction to provide reliable results. This is also due in part to having to meticulously control the physical environments of existing quantum hardware. Indeed, existing quantum hardware must be kept at cryogenic temperatures so as to maintain coherence and minimize detrimental noise effects. Because quantum computing resources can be quite difficult to create and operate, some industrial companies specialize in the construction and maintenance of quantum computing resources. Moreover, such industrial companies can offer quantum computing resources as a remote service (e.g., a cloud service) to clients. Thus, a client that desires to execute a classical-quantum algorithm can leverage such a remote quantum computing service to do so.

An existing remote quantum computing service can function as follows. First, a client device (e.g., a desktop computer, a laptop computer) can execute classical processing (e.g., can execute a current iteration of a classical optimization loop of a classical-quantum algorithm). In various aspects, such classical processing can specify and/or otherwise indicate a quantum computation to be performed (e.g., can identify one or more particular quantum circuits that are to be applied to one or more particular quantum states). In various cases, the client device can transmit an instruction to perform the quantum computation to the remote quantum computing service. In various aspects, the instruction can be transmitted over the internet, can be received by an application programming interface of the remote quantum computing service, and can be placed in a queue of the remote quantum computing service. In various instances, the remote quantum computing service can extract the instruction from the queue, and can perform on quantum hardware (e.g., quantum substrates comprising qubits that can be operated via microwave pulses) the quantum computation specified in the instruction. In various cases, the remote quantum computing service can transmit results generated by the quantum hardware back to the client device. In various aspects, the client device can complete its classical processing (e.g., can complete the current iteration of the classical optimization loop) by leveraging the results provided by the remote quantum computing service.

As the above description shows, an existing remote quantum computing service can exhibit a division between classical computing resources and quantum computing resources. More specifically, the classical computing resources can be located exclusively on the client-side, and the quantum computing resources can be located exclusively on the service-side. The present inventors realized that such a divided architecture can exhibit poor performance due to high-latency interactions between the classical computing resources and the quantum computing resources. Indeed, as mentioned above, the quantum computation instruction that is transmitted from the client device is executed by the remote quantum computing service only after the quantum computation instruction travels across the internet, traverses the application programming interface, and waits in the queue. Accordingly, transmission of the quantum computation instruction from the client device to the remote quantum computing service can be considered as a high-latency interaction (e.g., it can take time for the quantum computation instruction to reach the application programming interface over an internet connection, to be accepted by the application programming interface, and/or to wait in the queue). If the client device is executing a classical-quantum algorithm that involves a classical optimization loop, the client device can have many repetitive high-latency interactions with the remote quantum computing service (e.g., the client device can transmit one or more quantum computation instructions to the remote quantum computing service for each iteration of the classical optimization loop). Thus, the high-latency interactions can quickly accumulate, which can undesirably extend the amount of time required for the client device to complete the classical-quantum algorithm. Systems and/or techniques that can address this technical problem can be desirable.

Various embodiments of the invention can address one or more of these technical problems. Specifically, various embodiments of the invention can provide systems and/or techniques that can facilitate backend quantum runtimes. In various aspects, embodiments of the invention can be considered as a computerized tool (e.g., a combination of computer hardware and/or computer software) that can more efficiently provide a remote quantum computing service to client devices as compared to existing techniques.

In various instances, the computerized tool can be considered as a backend server that is bundled with (e.g., collocated with, and/or in dedicated communication with) quantum hardware. In various cases, the computerized tool can electronically receive as input a computer program from a client device. In various aspects, the computer program can be configured to specify, identify, and/or otherwise indicate quantum computations to be performed. In various instances, the computerized tool can electronically host the computer program. That is, the computerized tool can classically execute the computer program, thereby causing the computer program to indicate the quantum computations. Moreover, in various cases, the computerized tool can electronically instruct the quantum hardware with which it is bundled to perform the quantum computations. In various aspects, the computerized tool can continue and/or complete the classical execution of the computer program by leveraging quantum results generated by the quantum hardware.

In various embodiments, such a computerized tool can comprise a receiver component, a runtime manager component, a quantum computing device, a recording component, and/or a transmitter component.

In various embodiments, there can be a client device, which can be any suitable combination of computer-executable hardware and/or computer-executable software. For example, the client device can be a desktop computer, a laptop computer, a smart phone device, and/or a tablet device. In various instances, the client device can electronically store, maintain, and/or otherwise have access to a computer program. In various aspects, the computer program can be configured to specify quantum computations upon and/or during classical execution. That is, the computer program can be an executable script that facilitates the performance of a classical-quantum algorithm (e.g., VQE and/or QAOA). For instance, the computer program can include a classical optimization loop, where each iteration of the classical optimization loop calls for and/or otherwise requires the performance of a specified quantum computation.

In various cases, an operator of the client device can desire to fully execute the computer program. However, since the computer program can involve quantum computations, the client device can be unable to fully execute the computer program. To solve this problem, the client device can communicate with the computerized tool described herein. As made apparent by the herein disclosure, the client device and the computerized tool can, in various cases, be considered as being in a client-server relationship, where the client device can be considered as a front-end client, and where the computerized tool can be considered as a backend server that performs some functionality for the front-end client. In various aspects, that functionality can be the full hosting and/or execution (e.g., both classical and quantum execution) of the computer program, as described herein.

In various embodiments, the receiver component of the computerized tool can electronically receive and/or retrieve the computer program from the client device, via any suitable wired and/or wireless electronic connection. Accordingly, other components of the computerized tool can electronically interact with the computer program. In various instances, the receiver component can also electronically receive and/or retrieve from the client device indications of any suitable software libraries that are required in order to execute the computer program and/or on which the computer program otherwise relies. In various aspects, the receiver component can additionally electronically receive and/or retrieve from the client device any suitable input parameters which are to be fed to the computer program.

In various embodiments, the runtime manager component of the computerized tool can electronically spool a runtime container for the computer program. In various aspects, the runtime container can be any suitable computer-executable software container that can classically execute any non-quantum portions of the computer program. As some non-limiting examples, the runtime container can be a Docker® container, a Kubernetes® container, a containerd container, and/or any other suitable operating-system-level virtualization that is capable of hosting a software application. In various instances, the computer program can be considered as a software image that is hosted, implemented, and/or executed by the runtime container. In various cases, if the client device provides to the receiver component indications of one or more software libraries on which the computer program relies, the runtime manager component can electronically instantiate the runtime container with such software libraries (e.g., the runtime manager component can spool the runtime container and can cause the runtime container to download such software libraries from any suitable and electronically-accessible data structures).

In various aspects, the runtime container can classically execute the computer program (e.g., can execute non-quantum instructions contained within the computer program). In various instances, if the client device provides to the receiver component input parameters for the computer program, the runtime container can feed such input parameters to the computer program prior to and/or during such classical execution. In various aspects, such classical execution of the computer program can cause the computer program to request that a quantum computation be performed, based on the input parameters. For example, during classical execution by the runtime container, the computer program can receive as input parameters a specific quantum operator, a parameterized quantum circuit, and/or a set of circuit parameter values, and the objective of the computer program can be to estimate the expectation value of the quantum operator. In various cases, the computer program can construct a particular quantum state (e.g., which can be represented by quantum probability amplitudes) and/or a particular quantum circuit (e.g., which can be a sequence of quantum gates) based on such input parameters. Moreover, during classical execution by the runtime container, the computer program can indicate that the particular quantum circuit is to be applied to the particular quantum state. In various cases, the computer program's indication that the particular quantum circuit is to be applied to the particular quantum state can be considered and/or otherwise interpreted as an indication of and/or a request for a particular quantum computation. In various cases, once this particular quantum computation is facilitated, the computer program can utilize the particular quantum computation to estimate the expectation value of the quantum operator.

In various embodiments, the quantum computing device of the computerized tool can electronically receive, from the runtime container, an instruction to perform the quantum computation indicated by the computer program. In various aspects, the quantum computing device can be any suitable quantum processing unit that includes any suitable number of any suitable types of qubits that are coupled in any suitable arrangement. For example, the quantum computing device can comprise a quantum substrate (e.g., silicon wafer), an array of superconducting qubits (e.g., transmon qubits) fabricated on the quantum substrate, and/or microwave resonators fabricated on the quantum substrate and configured to controllably alter the states of the superconducting qubits. In various instances, the quantum computing device can further comprise any suitable quantum error correction hardware. In various instances, the quantum computing device can perform the indicated quantum computation and can return a quantum result back to the runtime container. For example, suppose that classical execution by the runtime container causes the computer program to request that a particular quantum circuit be applied to a particular quantum state. In such case, the quantum computing device can initialize its qubits to be in the particular quantum state, and the quantum computing device can manipulate the states of its initialized qubits according to the particular quantum circuit. In various cases, the resulting quantum state of the qubits of the quantum computing device can be considered as the quantum result. In various other cases, the particular quantum circuit can include measurements that yield classical bits. Such classical bits can, in various aspects, be considered as the quantum result.

In various instances, the runtime container can retrieve the quantum result from the quantum computing device, and the runtime container can utilize the quantum result to classically generate and/or calculate some program result. In other words, the runtime container can utilize the quantum result to continue and/or complete the classical execution of the computer program.

Suppose that the computer program involves a classical optimization loop. In such case, classical execution by the runtime container can cause the computer program to iterate any suitable number of times (e.g., until a convergence criterion is achieved). For each iteration, the computer program can indicate a quantum computation to be performed during that iteration, and the quantum result of such quantum computation can be used to compute a program result during that iteration. Moreover, the quantum computation of any given iteration can be based on the program result of the previous iteration (and/or whatever persistent state is carried in the computer program). Accordingly, for each iteration of the computer program, the runtime container can instruct the quantum computing device to perform a quantum computation corresponding to that iteration, the runtime container can receive from the quantum computing device a quantum result corresponding to that iteration, and/or the runtime container can utilize the quantum result to compute some program result corresponding to that iteration. The runtime container can then move on to the next iteration.

In various embodiments, the runtime container can be bundled with the quantum computing device, so that communication between the runtime container and the quantum computing device is low-latency. For example, the runtime container can be computer software that is running on a particular computing machine, and that particular computing machine can be physically coupled and/or physically collocated with the quantum computing device (e.g., the quantum computing device and the particular computing machine can in the same room, and thus can be easily physically wired together), thereby resulting in low-latency communication between the runtime container and the quantum computing device. As another example, the runtime container can be computer software that is running on a particular computing machine, and that particular computing machine can have a dedicated wireless electronic connection with the quantum computing device (e.g., the quantum computing device and the particular computing machine can be coupled via a fixed-bandwidth network connection that is not shared with other computing devices, notwithstanding that the quantum computing device and the particular computing machine might not be collocated), thereby resulting in low-latency communication between the runtime container and the quantum computing device.

In various embodiments, the recording component of the computerized tool can electronically record and/or store the quantum results and/or the program results generated by the quantum computing device and/or the runtime container. If the computer program includes a classical optimization loop, the recording component can electronically document the quantum result and/or the program result for each iteration. In other words, the recording component can be considered as recording intermediate results produced by the computer program (e.g., quantum results and/or program results from non-final iterations of the computer program) and final results produced by the computer program (e.g., a quantum result and/or a program result from the final iteration of the computer program). In various aspects, the recording component can comprise any suitable database and/or data structure, and/or can store/maintain the intermediate and/or final results of the computer program in any suitable data formats.

In various embodiments, the transmitter component of the computerized tool can electronically transmit the intermediate results and/or the final results of the computer program to the client device.

To help clarify some of the above discussion, consider the following non-limiting example. Suppose that the computer program is configured to iteratively compute the expectation values of a Hamiltonian. Moreover, suppose that the computer program comprises a classical optimization loop that involves n iterations, for any suitable positive integer n. Furthermore, suppose that each iteration involves the formulation of a quantum state and the application of the Hamiltonian to the quantum state. Note that the application of the Hamiltonian to a quantum state is a quantum computation.

In such case, the client device can transmit to the receiver component the computer program, an indication of any software libraries relied upon by the computer program, and ansatz parameters that are to be fed to the computer program. In various aspects, the ansatz parameters can be considered as initial guesses for the expectation values of the Hamiltonian. In various instances, the runtime manager component can instantiate a runtime container that can implement/download the indicated software libraries and that can host the computer program. In various cases, the runtime container can feed the ansatz parameters to the computer program and can commence classical execution of the computer program.

During a first iteration, the computer program can use the ansatz parameters to compute a first quantum state, and the computer program can indicate that the Hamiltonian is to be applied to the first quantum state. Accordingly, the runtime container can instruct the quantum computing device to initialize its qubits into the first quantum state and to apply transformations to the initialized qubits according to the Hamiltonian. The runtime container can receive a resultant quantum state from the quantum computing device, and the computer program can check a convergence criterion based on the resultant quantum state. If the convergence criterion is not yet met, the computer program can update the ansatz parameters and can move on to a second iteration. Here, the resultant quantum state produced by the quantum computing hardware can be considered as a quantum result, and the updated ansatz parameters can be considered as a program result.

During the second iteration, the computer program can use the previously-updated ansatz parameters to compute a second quantum state, and the computer program can indicate that the Hamiltonian is to be applied to the second quantum state. Accordingly, the runtime container can instruct the quantum computing device to initialize its qubits into the second quantum state and to apply transformations to the initialized qubits according to the Hamiltonian. The runtime container can receive a resultant quantum state from the quantum computing device, and the computer program can check a convergence criterion based on the resultant quantum state. If the convergence criterion is not yet met, the computer program can again perturb the ansatz parameters and can move on to a third iteration.

The runtime container and the quantum computing hardware can continue such operation for the remainder of the n iterations. In this non-limiting example, this can mean that the ansatz parameters are updated by the computer program n different times, with the n-th updated ansatz parameters being the optimized program results produced by the computer program. In various cases, the recorder component can record the updated ansatz parameters produced during each iteration of the computer program. Once the computer program converges (e.g., after n iterations), the transmitter component can transmit the optimized program results to the client device.

Note that, in each of the n iterations, the runtime container and the quantum computing device can communicate with each other twice (e.g., the runtime container can instruct the quantum computing device to perform a quantum computation, and the quantum computing device can provide a quantum result), for a total of 2n communications. However, since the runtime container and the quantum computing device can be tightly bundled (e.g., can be collocated and/or in dedicated network connection with each other), these 2n transmissions can each be low-latency (e.g., not excessively time consuming). In addition to these 2n low-latency transmissions, the computerized tool can communicate with the client device twice (e.g., once to receive the computer program and once to provide the final program results), for a total of 2n+2 transmissions.

Now, consider how an existing remote quantum computing service would perform in this non-limiting example. The client device would itself host the computer program. That is, the client device would feed the ansatz parameters to the computer program and would commence classical execution of the computer program.

During the first iteration, the computer program would use the ansatz parameters to compute the first quantum state, and the computer program would indicate that the Hamiltonian is to be applied to the first quantum state. Accordingly, the client device would transmit an instruction to the existing remote quantum computing service to initialize its qubits into the first quantum state and to apply transformations to the initialized qubits according to the Hamiltonian. The client device would then receive the resultant quantum state from the existing remote quantum computing service, and the computer program would check a convergence criterion based on the resultant quantum state. If the convergence criterion is not yet met, the computer program would update the ansatz parameters and would move on to a second iteration. The client device and existing remote quantum computing service would continue such operation for the remainder of the n iterations.

Note that, in each of the n iterations, the client device and the existing remote quantum computing service can communicate with each other twice (e.g., the client device can instruct the existing remote quantum computing service to perform a quantum computation, and the existing remote quantum computing service can provide a quantum result), for a total of 2n transmissions. However, since the client device and the existing remote quantum computing service can be not tightly bundled (e.g., can be not collocated, can be not in dedicated network connection with each other, can be separated by a queue), these 2n transmissions can each be high-latency (e.g., excessively time consuming). Indeed, in various cases, each of these 2n high-latency transmissions can be significantly more time-consuming than each of the 2n low-latency transmissions associated with the computerized tool described herein. Thus, even though implementation of the existing remote quantum computing service in this non-limiting example can require two fewer transmissions than implementation of the computerized tool described herein, the total amount of time (e.g., total latency) consumed by implementation of the existing remote quantum computing service can be significantly higher than the total amount of time (e.g., total latency) consumed by implementation of the computerized tool described herein.

In other words, the computerized tool described herein can exhibit significantly reduced latency as compared to existing remote quantum computing services. Such a latency reduction can be due to the fact that the computerized tool can receive, from the client device, and can host an entire computer program which, upon classical execution, specifies quantum computations. That is, the computerized tool can manage, in a backend environment, both the classical execution of the computer program and the performance/execution of quantum computations specified by the computer program. Indeed, because the computerized tool can be tightly bundled to a quantum computing device, the computerized tool can efficiently execute such quantum computations without requiring costly high-latency transmissions to the client device during each iteration of the computer program. In stark contrast, although an existing remote quantum computing service is itself tightly bundled to a quantum computing device, the existing remote quantum computing service can neither receive nor host the computer program. Instead, when existing techniques are implemented, the client device would itself host the computer program, and the client device must engage in costly high-latency transmissions with the existing remote quantum computing service during each iteration of the computer program.

In still other words, when a quantum computing device is offered in a backend environment as a remote service (e.g., a cloud service), and when a frontend client desires to leverage the quantum computing device to execute a classical-quantum computer program, the present inventors recognized that latency can be significantly reduced by hosting the classical-quantum computer program in the backend environment, as compared to existing techniques which involve hosting the classical-quantum computer program in the frontend environment. By hosting the classical-quantum computer program in the frontend environment, high-latency interactions between the frontend classical computing resources and the backend quantum computing resources can quickly accumulate. In contrast, by hosting the classical-quantum computer program in the backend environment, both the classical computing resources and the quantum computing resources can be tightly bundled together in the backend environment, which means that there can be primarily low-latency interactions between the classical computing resources and the quantum computing resources. That is, when the classical-quantum computer program is hosted in the backend environment, significantly latency reduction can occur.

Various embodiments of the invention can be employed to use hardware and/or software to solve problems that are highly technical in nature (e.g., to facilitate backend quantum runtimes), that are not abstract and that cannot be performed as a set of mental acts by a human. Further, some of the processes performed can be performed by a specialized computer (e.g., runtime manager, quantum computing device). In various aspects, some defined tasks associated with various embodiments of the invention can include: accessing, by a backend device operatively coupled to a processor, a computer program provided by a client device, wherein the computer program is configured to indicate a quantum computation; and hosting, by the backend device, the computer program by spooling a runtime container, wherein the runtime container orchestrates both classical execution of the computer program and quantum execution of the quantum computation indicated by the computer program. Such defined tasks are not typically performed manually by humans. Moreover, neither the human mind nor a human with pen and paper can electronically access a computer program that is configured to indicate a quantum computation, and electronically host the computer program by spooling/instantiating a runtime container that manages both classical execution and quantum execution of the computer program. Instead, various embodiments of the invention are inherently and inextricably tied to computer technology and cannot be implemented outside of a computing environment (e.g., computer programs are inherently computerized objects that cannot exist outside of computing systems; likewise, a computerized tool that handles, in a backend environment, both classical execution and quantum execution of the computer program is also an inherently computerized device that cannot be practicably implemented in any sensible way without computers).

In various instances, embodiments of the invention can integrate into a practical application the disclosed teachings regarding backend quantum runtimes. Indeed, as described herein, various embodiments of the invention, which can take the form of systems and/or computer-implemented methods, can be considered as a computerized tool that can reduce latency associated with remote quantum computing services. Specifically, as explained above, the computerized tool can receive, from a client device, a computer program, where the computer program in configured to request that quantum computations be performed. In various aspects, the computerized tool can spool a backend runtime container that can host the computer program in a backend environment. That is, the backend runtime container can manage both classical execution of the computer program and performance/execution of the quantum computations requested by the computer program. Indeed, the backend runtime container can be tightly bundled with a backend quantum computing device, and thus the backend runtime container can instruct the backend quantum computing device to perform the quantum computations specified by the computer program. Although this can involve multiple transmissions between the backend runtime container and the backend quantum computing device, such multiple transmissions can each be low-latency due to the tight bundling, meaning that the overall time consumed by such multiple transmissions can be minimal. In stark contrast, when existing techniques are implemented, such multiple transmissions do not occur between tightly bundled components, but instead occur between the client device and an existing remote quantum computing service. Because the client device and the existing remote quantum computing service are not tightly bundled, such multiple transmissions can each be high-latency, meaning that the overall time consumed by such multiple transmissions can be undesirably high. In other words, the computer tool as described herein can significantly reduce communication latency of remote quantum computing services. Systems and/or techniques that can reduce the communication latency of remote quantum computing services in this way clearly constitute a concrete and tangible technical improvement in the field of quantum computing.

Furthermore, various embodiments of the invention can control tangible, hardware-based, and/or software-based devices based on the disclosed teachings. For example, embodiments of the invention can actually execute, on tangible quantum hardware, quantum circuits.

It should be appreciated that the figures and the herein disclosure describe non-limiting examples of various embodiments of the invention.

FIG. 1 illustrates a block diagram of an example, non-limiting system 100 that can facilitate backend quantum runtimes in accordance with one or more embodiments described herein. As shown, a backend quantum runtime system 102 can be electronically integrated, via any suitable wired and/or wireless electronic connection, with a client device 104.

In various aspects, the client device 104 can be any suitable combination of computer-executable hardware and/or computer-executable software. For example, the client device 104 can be a laptop computer, a desktop computer, a vehicle-integrated computer, a smart mobile device, a tablet device, and/or any other suitable classical computing device. In various cases, the client device 104 can lack quantum hardware. For instance, the client device 104 can lack quantum substrates (e.g., silicon wafers) on which are fabricated qubits (e.g., superconducting qubits) and microwave resonators which can control operational states of the qubits. Accordingly, the client device 104 can be unable to perform quantum computations.

In various instances, the client device 104 can electronically store, electronically maintain, and/or otherwise electronically access a computer program. In various cases, the computer program can be any suitable executable script that includes both classical computing instructions (e.g., coding instructions that are handleable by a classical computer) and quantum computing instructions (e.g., coding instructions that are handleable by a quantum computer). For instance, the computer program can, upon and/or during classical execution, identify, specify, indicate, and/or otherwise request that one or more quantum computations be facilitated. Because the client device 104 can lack quantum hardware, the client device 104 cannot perform such quantum computations, and thus the client device 104, alone, can be unable to fully execute the computer program.

In various aspects, to address this problem, the client device 104 can electronically communicate with the backend quantum runtime system 102 so as to fully execute the computer program. In various cases, the client device 104 can be considered as a frontend client, and the backend quantum runtime system 102 can be considered as a backend server (e.g., a cloud server) that can assist the client device 104 in fully executing the computer program. In other words, the backend quantum runtime system 102 can be considered as providing a remote quantum computing service to the client device 104. However, as explained herein, the backend quantum runtime system 102 can exhibit significantly reduced latency as compared to existing remote quantum computing services.

In various embodiments, the backend quantum runtime system 102 can comprise a processor 106 (e.g., computer processing unit, microprocessor) and a computer-readable memory 108 that is operably connected to the processor 106. The memory 108 can store computer-executable instructions which, upon execution by the processor 106, can cause the processor 106 and/or other components of the backend quantum runtime system 102 (e.g., receiver component 110, runtime manager component 112, quantum computing device 114, recording component 116, transmitter component 118) to perform one or more acts. In various embodiments, the memory 108 can store computer-executable components (e.g., receiver component 110, runtime manager component 112, quantum computing device 114, recording component 116, transmitter component 118), and the processor 106 can execute the computer-executable components.

In various embodiments, the backend quantum runtime system 102 can comprise a receiver component 110. In various aspects, the receiver component 110 can electronically retrieve and/or otherwise electronically access the computer program from the client device 104. That is, the client device 104 can electronically transmit the computer program to the receiver component 110. Accordingly, in various instances, other components of the backend quantum runtime system 102 can manipulate and/or otherwise interact with the computer program. In various cases, the receiver component 110 can further electronically retrieve and/or otherwise electronically access from the client device 104 indications of one or more software libraries (e.g., quantum circuit libraries) that the computer program requires and/or upon which the computer program relies.

In various embodiments, the backend quantum runtime system 102 can comprise a runtime manager component 112. In various aspects, the runtime manager component 112 can electronically spool, electronically instantiate, and/or otherwise electronically generate a runtime container based on the computer program. In various instances, the runtime container can host the computer program. Because the backend quantum runtime system 102 can be remote from the client device 104 (e.g., can be in a backend environment, such as a cloud environment, while the client device 104 can be in a frontend environment), the runtime container spooled by the runtime manager component 112 can be considered as hosting the computer program remotely and/or away from the client device 104. In various aspects, the runtime container can be any suitable software container from any suitable containerized computing paradigm. For example, the runtime container can be a Docker® container, a Kubernetes® container, and/or a containerd container. In various instances, if the client device 104 transmits to the receiver component 110 indications of one or more software libraries on which the computer program relies, the runtime manager component 112 can instantiate the runtime container with such software libraries. For example, the runtime manager component 112 can spool the runtime container and can command the runtime container to download and/or otherwise install, from any suitable data structure (not shown) that is accessible to the runtime container, such software libraries. Accordingly, the runtime container can host the computer program.

In various embodiments, the backend quantum runtime system 102 can comprise a quantum computing device 114. In various aspects, the quantum computing device 114 can comprise any suitable quantum hardware. For example, the quantum computing device 114 can include any suitable quantum substrates (e.g., silicon wafers) on which are fabricated any suitable number of any suitable types of qubit devices (e.g., superconducting qubits). In various cases, the qubits can be arranged and/or coupled together on such quantum substrates in any suitable fashion (e.g., qubits can be arranged in rectilinear arrays, in hexagonal arrays, and/or in any other suitable shapes). In various instances, such quantum substrates can also include any suitable quantum control hardware, such as microwave resonators, waveguides, and/or any suitable signaling components (e.g., transmitters and/or receivers) which can send electrical and/or optical stimuli to actuate operations on and/or take measurements of the qubits. That is, such quantum control hardware can be used to controllably alter the states of the qubits. In any case, the quantum computing device 114 can facilitate quantum computations. That is, the quantum computing device 114 can, in various instances, apply any suitable quantum circuit to any suitable quantum state.

In various instances, the runtime container and the quantum computing device 114 can be tightly bundled together, such that low-latency electronic communication can be facilitated by the runtime container and the quantum computing device 114. For example, in some cases, the runtime container can be collocated with the quantum computing device 114. For instance, the runtime manager component 112 can spool the runtime container on the processor 106 and/or the memory 108, and the processor 106 and/or the memory 108 can be physically located near the quantum computing device 114 such that the processor 106 and/or the memory 108 can be physically wired to the quantum computing device 114. As another example, in some cases, the runtime container and the quantum computing device 114 can communicate with each other via a dedicated network channel. For instance, although not explicitly shown in the figures, the runtime manager component 112 can spool the runtime container on a computing machine (not shown) that is remote from the quantum computing device 114 but that is nevertheless coupled to the quantum computing device 114 via a fixed-bandwidth wireless connection.

In various aspects, the runtime container and the quantum computing device 114 can work together to fully execute the computer program. More specifically, in various instances, the runtime container can classically execute the computer program. Such classical execution can cause the computer program to specify one or more quantum computations to be performed. In various instances, when the computer program specifies and/or otherwise calls for the performance/execution of such one or more quantum computations, the runtime container can transmit an instruction to the quantum computing device 114. Such instruction can cause the quantum computing device 114 to electronically perform the one or more quantum computations. In various cases, the quantum computing device 114 can transmit back to the runtime container quantum results yielded by the quantum computations. In various aspects, the runtime container can continue and/or complete the classical execution of the computer program by leveraging such quantum results. Continuing and/or completing the classical execution of the computer program in such way can yield one or more program results.

In other words, the runtime container can be considered as facilitating the classical instructions contained within the computer program, and the quantum computing device 114 can be considered as facilitating the quantum instructions contained within the computer program. In any case, the backend quantum runtime system 102 can fully execute the computer program remotely from the client device 104, via the runtime container and the quantum computing device 114.

In various embodiments, the backend quantum runtime system 102 can comprise a recording component 116. In various aspects, the recording component 116 can electronically record, log, document, maintain, and/or otherwise store the quantum results generated by the quantum computing device 114 and/or the program results generated by the runtime container. In various instances, the recording component 116 can comprise any suitable data structure (e.g., relational data structure, graph data structure, hybrid data structure). Moreover, in various cases, the recording component 116 can record, log, document, maintain, and/or otherwise store the quantum results and/or the program results in any suitable data formats.

In various embodiments, the backend quantum runtime system 102 can comprise a transmitter component 118. In various aspects, the transmitter component 118 can electronically transmit any of the quantum results and/or program results that are stored by the recording component 116 to the client device 104.

Figure 2:
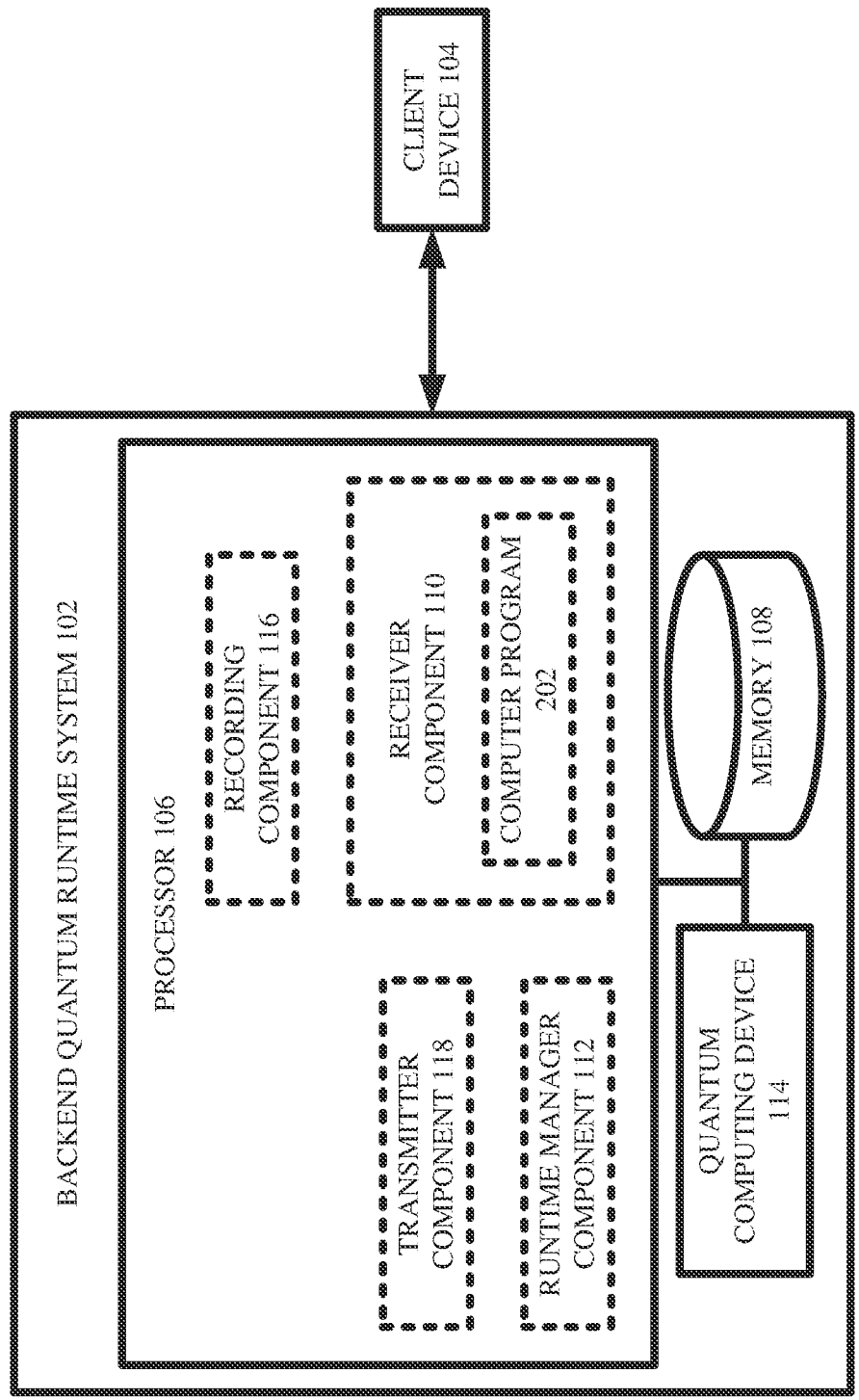
FIG. 2 illustrates a block diagram of an example, non-limiting system including a computer program that facilitates backend quantum runtimes in accordance with one or more embodiments described herein.

FIG. 2 illustrates a block diagram of an example, non-limiting system 200 including a computer program that can facilitate backend quantum runtimes in accordance with one or more embodiments described herein. As shown, the system 200 can, in some cases, comprise the same components as the system 100, and can further comprise a computer program 202.

In various embodiments, the receiver component 110 can electronically receive, retrieve, and/or access the computer program 202 from the client device 104. That is, the client device 104 can electronically provide the computer program 202 to the receiver component 110. In various aspects, the computer program 202 can be any suitable executable script that includes both classical computing instructions and quantum computing instructions. For instance, the computer program 202 can comprise a classical optimization loop, where each iteration of the classical optimization loop can involve a classical computation, and where each iteration of the classical optimization loop can also call for and/or otherwise request the performance/execution of a quantum computation. As a non-limiting example, the computer program 202 can be an executable script that facilitates the performance of VQE and/or QAOA. This is explained in further detail with respect to FIG. 3.

Figure 3:
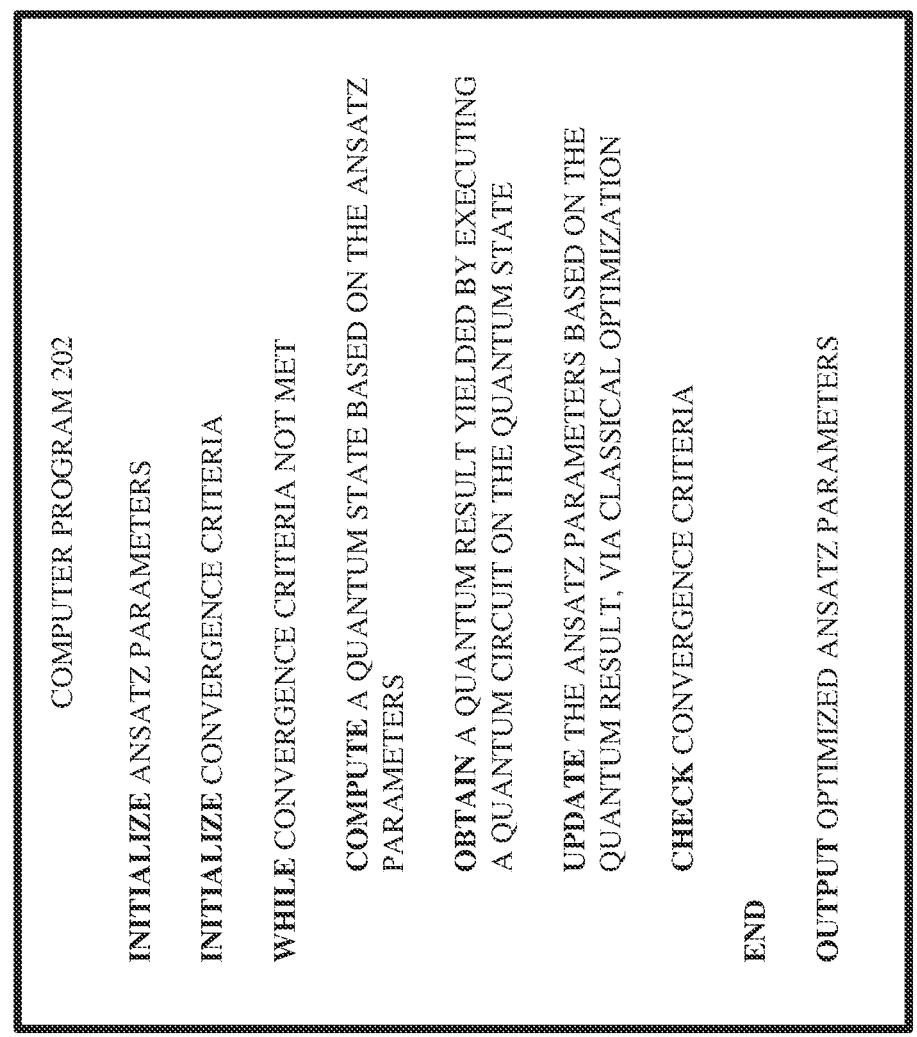
FIG. 3 illustrates a block diagram of an example, non-limiting computer program that includes a quantum computation within a classical optimization loop in accordance with one or more embodiments described herein.

FIG. 3 illustrates a block diagram of an example, non-limiting computer program that includes a quantum computation within a classical optimization loop in accordance with one or more embodiments described herein. In other words, FIG. 3 depicts pseudocode of a non-limiting and example embodiment of the computer program 202.

As shown, the computer program 202 can, in various instances, comprise a set of computing instructions 302 that are configured to iteratively compute some optimized set of parameters (e.g., some optimized set of scalars, vectors, matrices, and/or tensors).

In various aspects, the set of computing instructions 302 can include a computing instruction 304. In various cases, the computing instruction 304 can call for the initialization and/or receipt of ansatz parameters. As those having ordinary skill in the art will appreciate, ansatz parameters can be considered as an initial guess and/or an educated guess of the optimal parameter values that the computer program 202 is designed to iteratively compute.

In various instances, the set of computing instructions 302 can include a computing instruction 306. In various cases, the computing instruction 306 can call for the initialization and/or receipt of some convergence criteria. As those having ordinary skill in the art will appreciate, the convergence criteria (e.g., a cost function threshold and/or loss function threshold) can be leveraged to either continue and/or cease iteration of the computer program 202.

In various aspects, the set of computing instructions 302 can include a computing instruction 308. In various cases, the computing instruction 308 can, in this non-limiting example, begin a while-loop. Accordingly, the computing instructions that are nested within the while-loop (e.g., 310-316) can iterate until the convergence criteria are satisfied.

In various instances, the set of computing instructions 302 can include a computing instruction 310. In various cases, the computing instruction 310 can cause the formulation of a quantum state, based on the ansatz parameters. In various cases, the computing instruction 310 can involve any suitable quantum embedding technique (e.g., amplitude embedding) that can be implemented to convert the ansatz parameters into a quantum state (e.g., to transform the ansatz parameters into a quantum-processible format).

In various aspects, the set of computing instructions 302 can include a computing instruction 312. In various cases, the computing instruction 312 can call for and/or otherwise request that a quantum circuit be applied to the quantum state formulated in the computing instruction 310. In various cases, this can be interpreted as calling for and/or requesting that a quantum computation be performed. In various aspects, the result of such quantum computation can be referred to as a quantum result.

In various instances, the set of computing instructions 302 can include a computing instruction 314. In various cases, the computing instruction 314 can cause the ansatz parameters to be updated and/or perturbed, based on the quantum result. In various cases, the computing instruction 314 can involve any suitable classical optimization technique for updating and/or perturbing ansatz parameters.

In various aspects, the set of computing instructions 302 can include a computing instruction 316. In various cases, the computing instruction 316 can cause the convergence criteria to be checked. Again, the convergence criteria can, in various cases, be a threshold against which the updated ansatz parameters can be compared and/or against which a cost function and/or a loss function that is based on the updated ansatz parameters can be compared.

In various instances, the set of computing instructions 302 can include a computing instruction 318. In various cases, the computing instruction 318 can end the while-loop.

In various aspects, the set of computing instructions 302 can include a computing instruction 320. In various cases, the computing instruction 320 can cause the optimized ansatz parameters (e.g., the most recently updated ansatz parameters) to be outputted and/or provided.

As those having ordinary skill in the art will appreciate, the while-loop (e.g., the computing instructions 308-318) of the computer program 202 be considered as a classical optimization loop. This while-loop can iterate until the convergence criteria are satisfied. Furthermore, in various cases, the computing instruction 312 can be considered as calling for and/or otherwise requesting the performance/execution of a quantum computation. Since the computing instruction 312 is within the while-loop, the computer program 202 can, in this non-limiting example, be considered calling for a quantum computation with a classical optimization loop. In other words, the computer program 202 can call for the performance/execution of a quantum computation for each iteration of the while-loop (e.g., for each iteration of the classical optimization loop).

Figure 4:
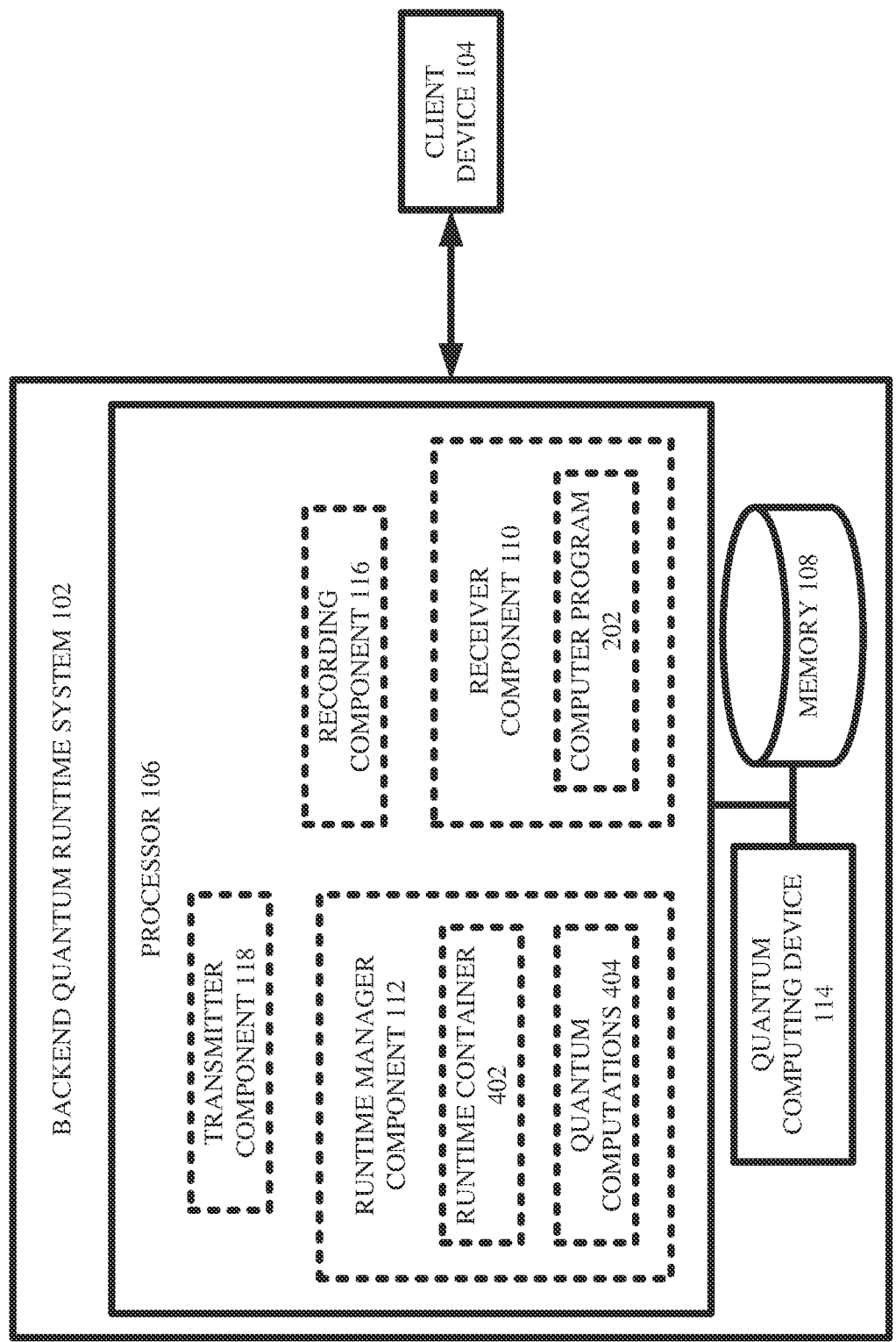
FIG. 4 illustrates a block diagram of an example, non-limiting system including a runtime container that facilitates backend quantum runtimes in accordance with one or more embodiments described herein.

FIG. 4 illustrates a block diagram of an example, non-limiting system 400 including a runtime container that can facilitate backend quantum runtimes in accordance with one or more embodiments described herein. As shown, the system 400 can, in some cases, comprise the same components as the system 200, and can further comprise a runtime container 402 and/or quantum computations 404.

In various embodiments, the runtime manager component 112 can electronically spool the runtime container 402, where the runtime container 402 can electronically host the computer program 202. Since the backend quantum runtime system 102 can be remote from the client device 104 (e.g., can be in a backend environment, such as a cloud environment, while the client device 104 can be in a frontend environment), the runtime container 402 can likewise be remote from the client device 104 (e.g., can also be in the backend environment).

In various instances, as mentioned above, the runtime container 402 can be any suitable software container in accordance with any suitable containerized application delivery paradigm (e.g., can be a Docker® container, a Kubernetes® container, and/or a containerd container). In various cases, the computer program 202 can be considered as a software image that is implementable and/or executable by the runtime container 402. Although not explicitly shown in the figures, the client device 104 can, in some instances, transmit to the receiver component 110 indications of one or more software libraries and/or software packages relied upon by the computer program 202. Accordingly, in such cases, the runtime container 402 can download and/or otherwise install such software libraries from any suitable data structures (not shown) that are electronically accessible to the runtime container 402.

In various aspects, as mentioned above, the runtime container 402 and the quantum computing device 114 can be tightly bundled together, such that low-latency electronic transmissions can be sent between the runtime container 402 and the quantum computing device 114. As an example, the runtime container 402 can be collocated with the quantum computing device 114. For instance, the runtime container 402 can be spooled on a computing machine (e.g., on the processor 106 and/or memory 108), and such computing machine can be physically located in close proximity to the quantum computing device 114, such that the computing machine and the quantum computing device 114 can be physically wired together. As another example, the runtime container 402 and the quantum computing device 114 can communicate with each other via any suitable dedicated electronic communication channel. For instance, although not explicitly shown in the figures, the runtime container 402 can be spooled on a computing machine that is remote from the quantum computing device 114 but that is nevertheless coupled to the quantum computing device 114 via a fixed-bandwidth wireless network connection.

In various aspects, the runtime container 402 and the quantum computing device 114 can cooperate to fully execute the computer program 202. For instance, the runtime container 402 can classically execute the computer program 202. In other words, the runtime container 402 can perform/handle any classical instructions contained within the computer program 202. Such classical execution can cause the computer program 202 to call for and/or otherwise specify one or more quantum computations 404 to be performed. As mentioned above, the computer program 202 can call for a quantum computation by specifying and/or otherwise indicating that a given quantum circuit should be applied to a given quantum state. In various instances, the runtime container 402 can electronically instruct, command, and/or otherwise cause the quantum computing device 114 to perform the one or more quantum computations 404. Thus, the quantum computing device 114 can perform/handle any quantum instructions contained within the computer program 202.

Figure 5:
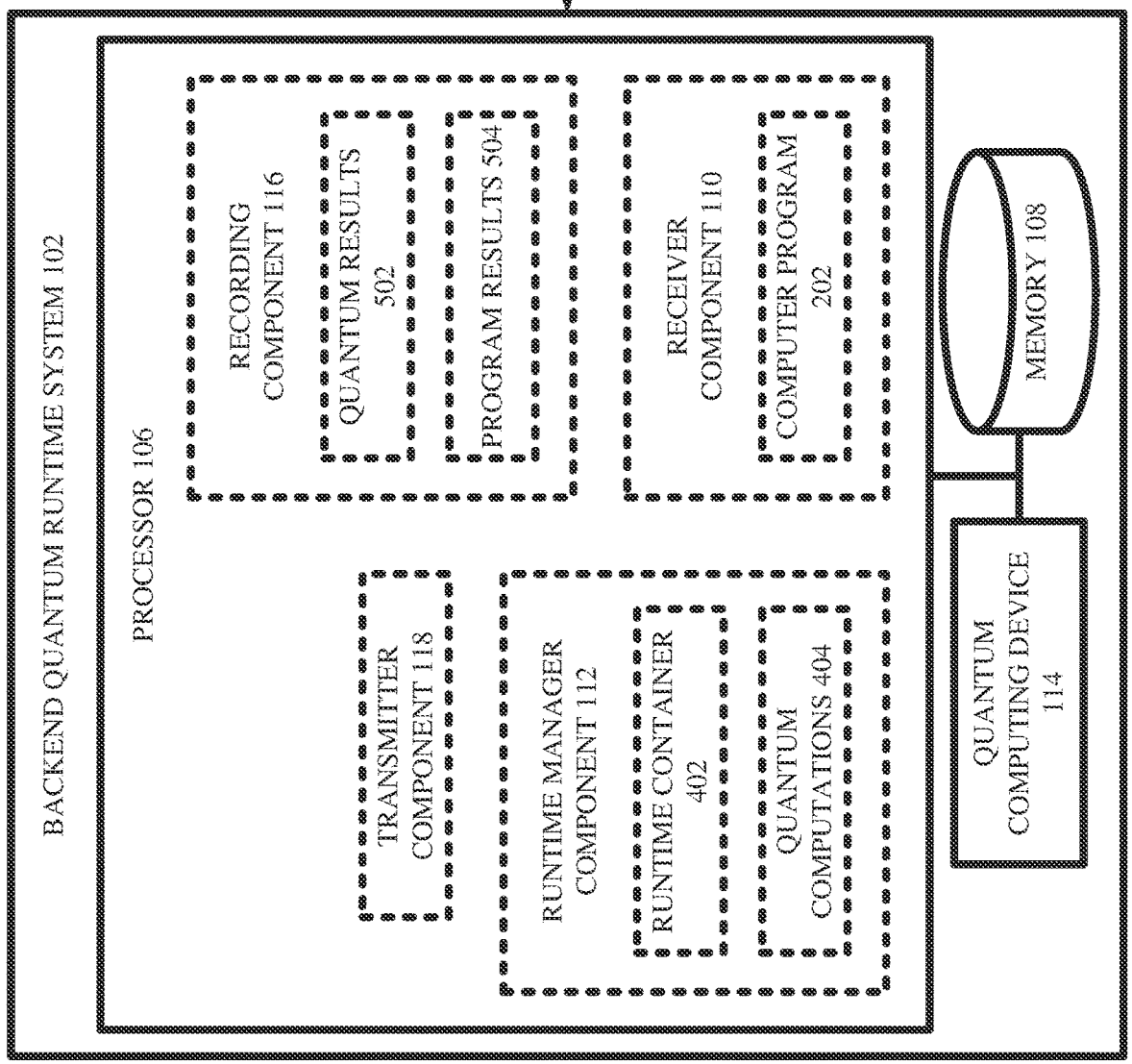
FIG. 5 illustrates a block diagram of an example, non-limiting system including quantum results and/or program results that facilitates backend quantum runtimes in accordance with one or more embodiments described herein.

FIG. 5 illustrates a block diagram of an example, non-limiting system 500 including quantum results and/or program results that can facilitate backend quantum runtimes in accordance with one or more embodiments described herein. As shown, the system 500 can, in some cases, comprise the same components as the system 400, and can further comprise quantum results 502 and/or program results 504.

As mentioned above, the quantum computing device 114 can perform the one or more quantum computations 404. In various cases, this can yield the one or more quantum results 502, which can respectively correspond to the one or more quantum computations 404. In various instances, each of the one or more quantum results 502 can be a resultant quantum state that is generated by the quantum computing device 114 based on a respective one of the one or more quantum computations 404. In various aspects, the one or more quantum results 502 can be electronically stored and/or maintained by the recording component 116.

In various aspects, the runtime container 402 can retrieve from the quantum computing device 114 (and/or from the recording component 116) the one or more quantum results 502. In various instances, the runtime container 402 can continue and/or complete the classical execution of the computer program 202 by utilizing the one or more quantum results 502. In various cases, this can yield the one or more program results 504. In various instances, each of the one or more program results 504 can be a scalar, vector, matrix, and/or tensor that is computed by the runtime container 402 based on a respective one of the one or more quantum results 502. In various aspects, the one or more program results 504 can be electronically stored and/or maintained by the recording component 116.

To help clarify some of this discussion, consider again the non-limiting example of the computer program 202 depicted in FIG. 3. In various cases, the computing instructions 304-310 can be considered as classical instructions. Accordingly, the runtime container 402 can electronically execute them. That is, the runtime container 402 can: initialize and/or otherwise obtain ansatz parameters, per the computing instruction 304; can initialize and/or otherwise obtain convergence criteria, per the computing instruction 306; can begin a while-loop that iterates for as long as the ansatz parameters do not satisfy the convergence criteria, per the computing instruction 308; and can compute and/or otherwise calculate a quantum state based on the ansatz parameters, per the computing instruction 310.

In various aspects, the computing instruction 312 can be considered as a quantum instruction rather than as a classical instruction, since it involves application of a quantum circuit to the quantum state formulated in the computing instruction 310. Such application of the quantum circuit to the quantum state can be considered as one of the one or more quantum computations 404. Accordingly, the runtime container 402 cannot electronically execute the computing instruction 312 by itself. However, the runtime container 402 can electronically instruct the quantum computing device 114 to apply the quantum circuit to the quantum state, which can yield a quantum result (e.g., one of the one or more quantum results 502). More specifically, in response to such instruction, the quantum computing device 114 can initialize its qubits, thereby causing the qubits to enter the quantum state specified by the computing instruction 310. Moreover, the quantum computing device 114 can then transform the states of its qubits according to the quantum circuit specified in the computing instruction 312. The resultant quantum state of the qubits of the quantum computing device 114 can be considered as the quantum result obtained in the computing instruction 312.

In various instances, the computing instructions 314-316 can be considered as classical instructions. Accordingly, the runtime container 402 can electronically execute them. That is, the runtime container 402 can: update, via any suitable classical optimization and/or perturbation technique, the ansatz parameters based on the quantum result, per the computing instruction 314; and can check whether the updated ansatz parameters satisfy the convergence criteria. If so, the runtime container 402 can end the while-loop per the computing instruction 318 and can proceed to the computing instruction 320. If not, the runtime container 402 can proceed back to the computing instruction 310 so as to perform another iteration of the while-loop.

So, as explained above, the runtime container 402 can be considered as facilitating the classical instructions contained within the computer program 202 (e.g., 304-310 and 314-320), and the quantum computing device 114 can be considered as facilitating the quantum instructions contained within the computer program 202 (e.g., 312). In any case, the runtime container 402 and the quantum computing device 114 can work together so as to fully execute the computer program 202 remotely from the client device 104 (e.g., so as to fully execute the computer program 202 in a backend and/or cloud environment).

Figure 6:
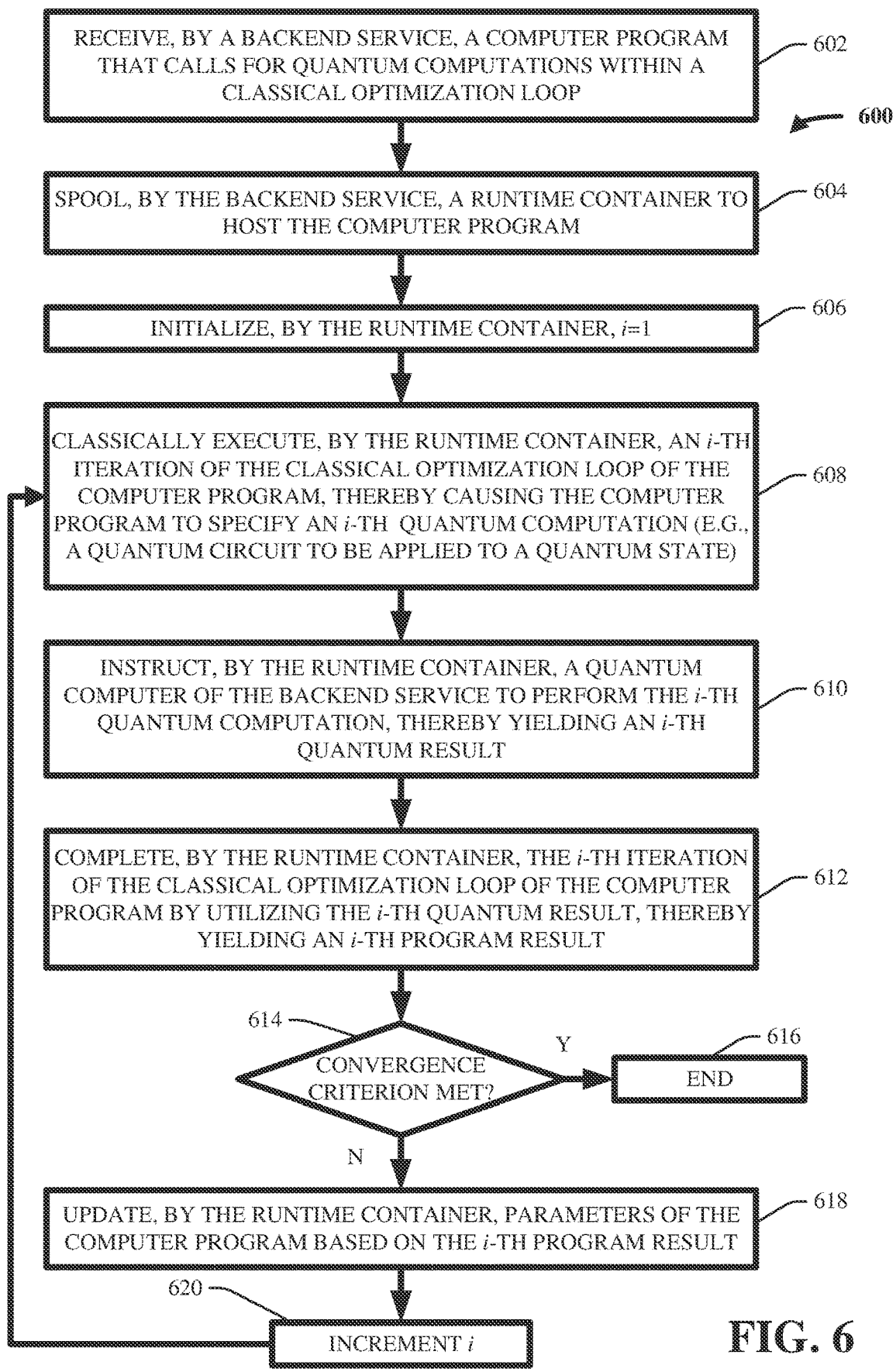
FIG. 6 illustrates a flow diagram of an example, non-limiting computer-implemented method that facilitates backend quantum runtimes in accordance with one or more embodiments described herein.

FIG. 6 illustrates a flow diagram of an example, non-limiting computer-implemented method 600 that can facilitate backend quantum runtimes in accordance with one or more embodiments described herein. In various instances, the computer-implemented method 600 can be facilitated by the backend quantum runtime system 102.

In various embodiments, act 602 can include receiving, by a backend service (e.g., 110), a computer program (e.g., 202) that calls for quantum computations (e.g., 312) with a classical optimization loop (e.g., 308-318).

In various aspects, act 604 can include spooling, by the backend service (e.g., 112), a runtime container (e.g., 402) to host the computer program.

In various instances, act 606 can include initializing, by the runtime container, i=1. Those having ordinary skill in the art will appreciate that, in this non-limiting example, i can be a dummy index to help facilitate iteration.

In various cases, act 608 can include classically executing, by the runtime container, an i-th iteration of the classical optimization loop of the computer program. In various instances, this can cause the computer program to specify and/or otherwise call for an i-th quantum computation (e.g., one of 404) to be performed. Such a quantum computation can, in various cases, take the form of applying a specified quantum circuit to a specified quantum state.

In various aspects, act 610 can include instructing, by the runtime container, a quantum computer (e.g., 114) of the backend service to perform the i-th quantum computation. In various cases, this can yield an i-th quantum result (e.g., one of 502).

In various instances, act 612 can include completing, by the runtime container, the i-th iteration of the classical optimization loop of the computing program by utilizing the i-th quantum result. This can, in various cases, yield an i-th program result (e.g., one of 504).

In various cases, act 614 can include determining, by the runtime container, whether a convergence criterion (e.g., 316) has been satisfied by the i-th program result. If so, the computer-implemented method 600 can proceed to act 616. If not, the computer-implemented method 600 can proceed to act 618.

In various aspects, act 616 can include ending the computer-implemented method 600 (e.g., by outputting the i-th program result as a the finalized and/or optimized result computed by the computer program).

In various instances, act 618 can include updating, by the runtime container, parameters (e.g., 314) of the computer program based on the i-th program result. In various cases, the computer-implemented method 600 can then proceed back to act 608.

Figure 7:
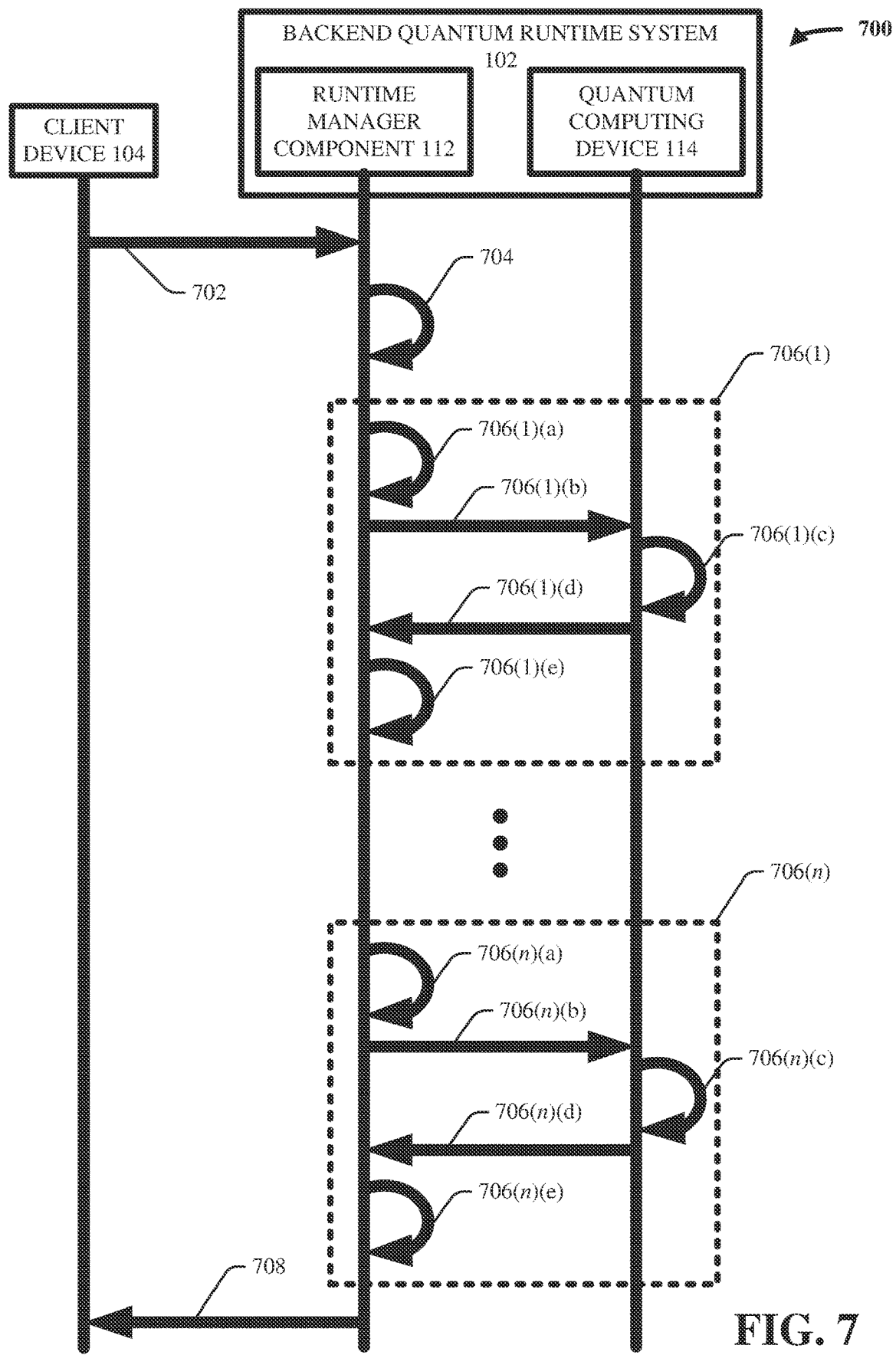
FIG. 7 illustrates a communication diagram of an example, non-limiting workflow that facilitates backend quantum runtimes in accordance with one or more embodiments described herein.

FIG. 7 illustrates a communication diagram of an example, non-limiting workflow 700 that can facilitate backend quantum runtimes in accordance with one or more embodiments described herein. In other words, FIG. 7 depicts a non-limiting example of how various components described herein can interact with each other.

In various embodiments, the client device 104 can, at act 702, electronically transmit to the backend quantum runtime system 102 the computer program 202.

In various aspects, the runtime manager component 112 can, at act 704, electronically instantiate the runtime container 402 to host the computer program 202.

Next, in various cases, the runtime container 402 and the quantum computing device 114 can collaborate so as to fully execute the computer program 202 remotely from the client device 104. Such collaboration can, in various instances, take the form of iterative interactions. Suppose that the computer program 202 is configured to iterate n times, for any suitable positive integer n. In such case, the runtime container 402 and the quantum computing device 114 can engage in n iterative interactions, the first of which is denoted as act 706(1), and the n-th of which is denoted as act 706(n).

During the first iterative interaction (e.g., during the first iteration of the computer program 202), the runtime container 402 can, at act 706(1)(a), begin classically executing the computer program 202. In various cases, this can cause the computer program 202 to specify, indicate, and/or otherwise call for the performance/execution of one of the one or more quantum computations 404. The runtime container 402 can then, at act 706(1)(b), electronically instruct the quantum computing device 114 to perform such quantum computation. In various instances, the quantum computing device 114 can facilitate and/or otherwise perform the quantum computation, at act 706(1)(c), thereby yielding one of the one or more quantum results 502. In various cases, the quantum computing device 114 can then, at act 706(1)(d), electronically transmit such quantum result back to the runtime container 402. In various aspects, the runtime container 402 can, at act 706(1)(e), complete the first iteration of the computer program 202, thereby yielding one of the one or more program results 504.

The runtime container 402 and/or the quantum computing device 114 can then move on to the next iteration, as exemplified by the act 706(n). Those having ordinary skill in the art will appreciate that the act 706(n) is analogous to the act 706(1).

In various aspects, once all n iterations of the computer program 202 have been completed, the runtime container 402 can, at act 708, electronically transmit finalized results (and/or, in some cases, intermediate results) produced by the computer program 202 to the client device 104.

As explained herein, the runtime container 402 can be tightly bundled with the quantum computing device 114 (e.g., can be collocated, can have a dedicated communication connection). Such tight bundling can cause each of the n iterative interactions between the runtime container 402 and the quantum computing device 114 to be low-latency (e.g., to not consume excessive time). In contrast, the client device 104 can be not tightly bundled with any component of the backend quantum runtime system 102. Such lack of tight bundling can cause each interaction between the client device 104 and the backend quantum runtime system 102 to consume more time than any interaction between the runtime container 402 and the quantum computing device 114. Note that, if existing techniques were implemented, there would be no runtime manager component 112 in FIG. 7. Instead, if existing techniques were implemented, all n of the iterative interactions would occur between the client device 104 and the quantum computing device 114. Since the client device 104 is not tightly bundled with the quantum computing device 114, each of such n iterative interactions can be high-latency. For large n, this means that existing techniques consume significantly more time than various embodiments of the backend quantum runtime system 102 as described herein. In other words, the backend quantum runtime system 102 can substantially reduce latency associated with existing remote quantum computing services and thus constitutes a concrete and tangible technical improvement in the field of quantum computing.

Most of the above discussion describes how various embodiments of the backend quantum runtime system 102 can leverage the runtime container 402 and the quantum computing device 114 to fully execute the computer program 202 in a backend (e.g., cloud) environment. In various embodiments, however, the backend quantum runtime system 102 can comprise multiple quantum computing devices and/or can spool multiple runtime containers to host multiple computer programs provided by multiple client devices. In other words, although the figures depict only a single client device 104, this is a non-limiting example for sake of brevity. In various cases, any suitable number of client devices 104 can electronically transmit, simultaneously and/or in staggered fashion, any suitable number of computer programs to the receiver component 110. Indeed, in some cases, a client device can electronically transmit more than one computer program to the receiver component 110. Similarly, although the figures depict only a single runtime container 402, this is a non-limiting example for sake of brevity. In various aspects, the runtime manager component 112 can electronically spool any suitable number of runtime containers. For instance, the runtime manager component 112 can electronically instantiate a runtime container for each of the computer programs received by the receiver component 110. Moreover, such any suitable number of runtime containers can, once spooled, operate in parallel with each other. Likewise, although the figures depict only a single quantum computing device 114, this is a non-limiting example for sake of brevity. In various instances, the backend quantum runtime system 102 can comprise any suitable number of quantum computing devices. Indeed, in various cases, the runtime containers spooled by the runtime manager component 112 can collectively apply load balancing across such any suitable number of quantum computing devices, so as to maximize quantum computation throughout.

Most of the above discussion describes how, in various embodiments, the runtime manager component 112 can host the computer program 202 by spooling the runtime container 402, where the runtime container 402 can be tightly bundled with the quantum computing device 114, where the runtime container 402 can execute any classical portions of the computer program 202, and where the runtime container 402 can command the quantum computing device 114 to execute any quantum portions of the computer program 202. However, it should be appreciated that this is a mere non-limiting example. In various other embodiments, the runtime manager component 112 can spool and/or instantiate any suitable backend classical computing resource to host the computer program 202. In various cases, the backend classical computing resource can be tightly bundled with the quantum computing device 114, the backend classical computing resource can execute any classical portions of the computer program 202, and the backend classical computing resource can command the quantum computing device 114 to execute any quantum portions of the computer program 202. In various aspects, the backend classical computing resource can exhibit any suitable software design and/or architecture that is capable of executing a software application. For instance, various non-limiting examples of such a backend classical computing resource can include a container (e.g., the runtime container 402), a virtual machine, and/or software deployed on a bare-metal computing machine. In other words, the runtime manager component 112 can, in various aspects, spool and/or instantiate any suitable piece of computer software that is capable of hosting and/or otherwise executing the computer program 202 as described herein.

In various embodiments, it can be desirable to allow the client device 104 to communicate with, interact with, and/or otherwise monitor the computer program 202 while the runtime container 402 is hosting the computer program 202. Similarly, in some cases, it can be desirable to allow the client device 104 to communicate with, interact with, and/or otherwise monitor the quantum computing device 114 while the runtime container 402 is hosting the computer program 202. Accordingly, in various aspects, the runtime manager component 112 can mediate communication/interaction between the client device 104, the computer program 202, and/or the quantum computing device 114. For example, in various cases, the client device 104 can transmit, in real-time, commands/instructions regarding the computer program 202 and/or regarding the quantum computing device 114 to the runtime manager component 112, and the runtime manager component 112 can implement and/or follow such commands/instructions. Non-limiting examples of such commands/instructions can include initiating execution of the computer program 202, ceasing execution of the computer program 202, editing the computer program 202, specifying desired characteristics and/or desired settings of the runtime container 402, specifying desired characteristics and/or desired settings of the quantum computing device 114, and/or specifying desired results to be fetched from the recording component 116. In various cases, other non-limiting examples of such commands/instructions can include firewalling and/or rate-limiting. In cases where multiple client devices, multiple computer programs, and/or multiple quantum computing devices are implemented, such commands/instructions can further include: modifying communication settings among the client devices, the computer programs, and/or the quantum computing devices, so as to enforce isolation between the client devices, so as to enforce trust domains between the client devices and the quantum computing devices, so as to provide fair-share access to the quantum computing devices and/or to the instantiated backend classical computing resources, and/or so as to provide different service levels (e.g., different quantum resources and/or classical resources) to different client devices based on client workloads.

Figure 8:
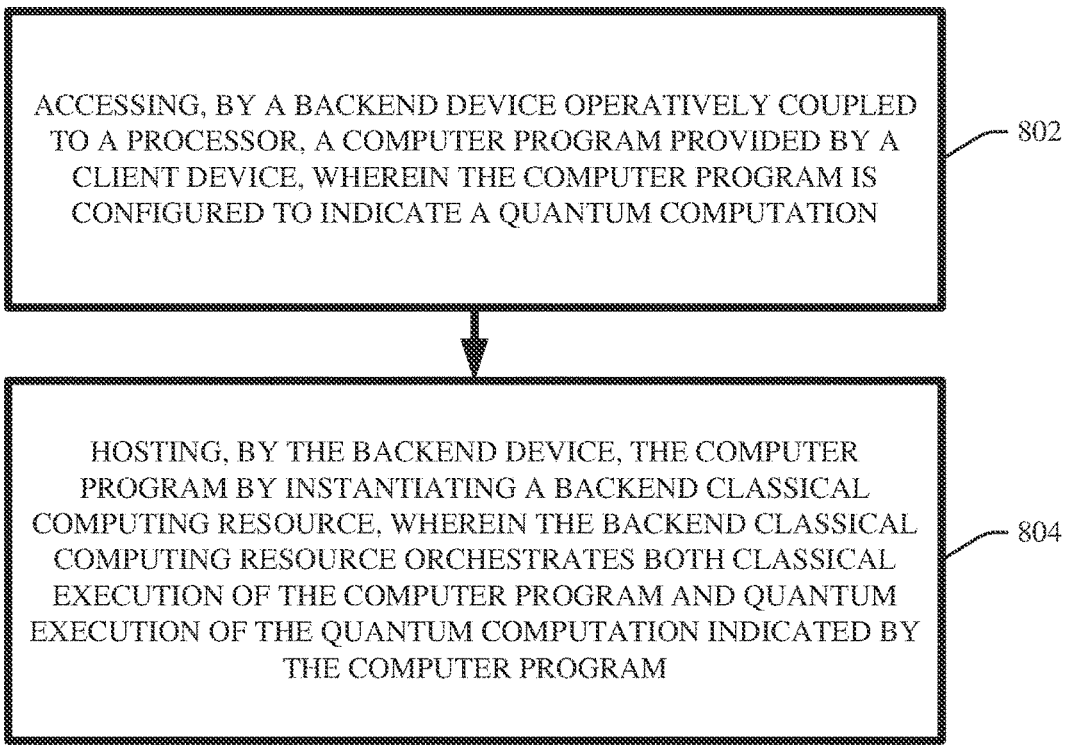
FIG. 8 illustrates a flow diagram of an example, non-limiting computer-implemented method that facilitates backend quantum runtimes in accordance with one or more embodiments described herein.

FIG. 8 illustrates a flow diagram of an example, non-limiting computer-implemented method 800 that can facilitate backend quantum runtimes in accordance with one or more embodiments described herein. In various aspects, the computer-implemented method 800 can be facilitated by the backend quantum runtime system 102.

In various embodiments, act 802 can include accessing, by a backend device (e.g., via the receiver component 110) operatively coupled to a processor, a computer program (e.g., the computer program 202) provided by a client device (e.g., the client device 104). In various cases, the computer program can be configured to indicate a quantum computation (e.g., one of the one or more quantum computations 404).

In various instances, act 804 can include hosting, by the backend device (e.g., via the runtime manager component 112), the computer program by instantiating a backend classical computing resource (e.g., the runtime container 402). In various cases, the backend classical computing resource can orchestrate both classical execution of the computer program and quantum execution of the quantum computation indicated by the computer program.

Although not explicitly shown in FIG. 8, the computer-implemented method 800 can further comprise: executing, by the backend device and in response to an instruction from the backend classical computing resource, the quantum computation on at least one backend quantum computing device (e.g., via the quantum computing device 114).

Although not explicitly shown in FIG. 8, during execution by the backend classical computing resource, the computer program can utilize quantum results (e.g., 502) generated by the at least one backend quantum computing device, thereby yielding program results (e.g., 504).

Although not explicitly shown in FIG. 8, the computer-implemented method 800 can further comprise: recording, by the backend device (e.g., via the recording component 116), the quantum results or the program results.

Although not explicitly shown in FIG. 8, the backend classical computing resource and the at least one backend quantum computing device can be collocated, and/or can be coupled via a dedicated communication channel.

Although not explicitly shown in FIG. 8, the backend classical computing resource can be a runtime container.

Although not explicitly shown in FIG. 8, the backend classical computing resource can mediate communication between the client device and the computer program.

Although not explicitly shown in FIG. 8, the computer-implemented method 800 can further comprise: accessing, by the backend device (e.g., via the receiver component 110), another computer program provided by another client device, wherein the another computer program is configured to indicate another quantum computation; and hosting, by the backend device (e.g., via the runtime manager component 112), the another computer program by instantiating another backend classical computing resource, wherein the another backend classical computing resource orchestrates both classical execution of the another computer program and quantum execution of the another quantum computation indicated by the another computer program, and wherein the another backend classical computing resource operates in parallel with the backend classical computing resource.

Complex quantum applications can require combining quantum processing resources with classical processing resources. Indeed, the field of quantum computing has seen a rise in algorithms that call quantum computations within classical optimization loops (e.g., VQE and/or QAOA). In order for such algorithms to be efficiently executed, interactions between quantum processing resources and classical processing resources should be relatively low-latency. Existing remote quantum computing services (e.g., cloud servers that offer quantum computing as a service) experience heightened latency, due to a bifurcated service architecture. In such existing systems, a user utilizes their own classical processor (e.g., laptop implementing Qiskit) to create and execute a computer program that calls for quantum computations. When the computer program calls for a quantum computation (e.g., when the computer program specifies a certain quantum circuit to be applied to certain quantum state), the user transmits to the remote quantum computing service an instruction to perform the specified quantum computation. The user must then wait to receive quantum results from the remote quantum computing service. For a computer program that involves many iterations, such waiting can quickly accumulate, which can be undesirable.

Various embodiments of the invention can address this technical problem. The present inventors realized that the high latency of existing techniques is caused by the harsh bifurcation between the classical computing resources on the user-side and the quantum computing resources on the service-side. Accordingly, the present inventors devised various embodiments of the invention, in which both the classical computing resources and the quantum computing resources are provided on the service-side. Indeed, in various embodiments, a remote quantum computing service does not simply receive a request to perform a quantum computation, but instead receives and hosts an entire computer program that is configured to generate requests for quantum computations. Because the computer program can, according to various embodiments, be hosted and thus classically executed on the service-side, such classical execution can be more tightly coupled and/or bundled to the quantum computing resources of the service-side. Thus, an iterative computer program that calls for the performance/execution of quantum computations can be more quickly performed when various embodiments of the invention are implemented. In other words, a significant decrease in latency can be achieved since various embodiments of the invention eliminate bottlenecks that are inherent in existing remote quantum computing services.

Figure 9:
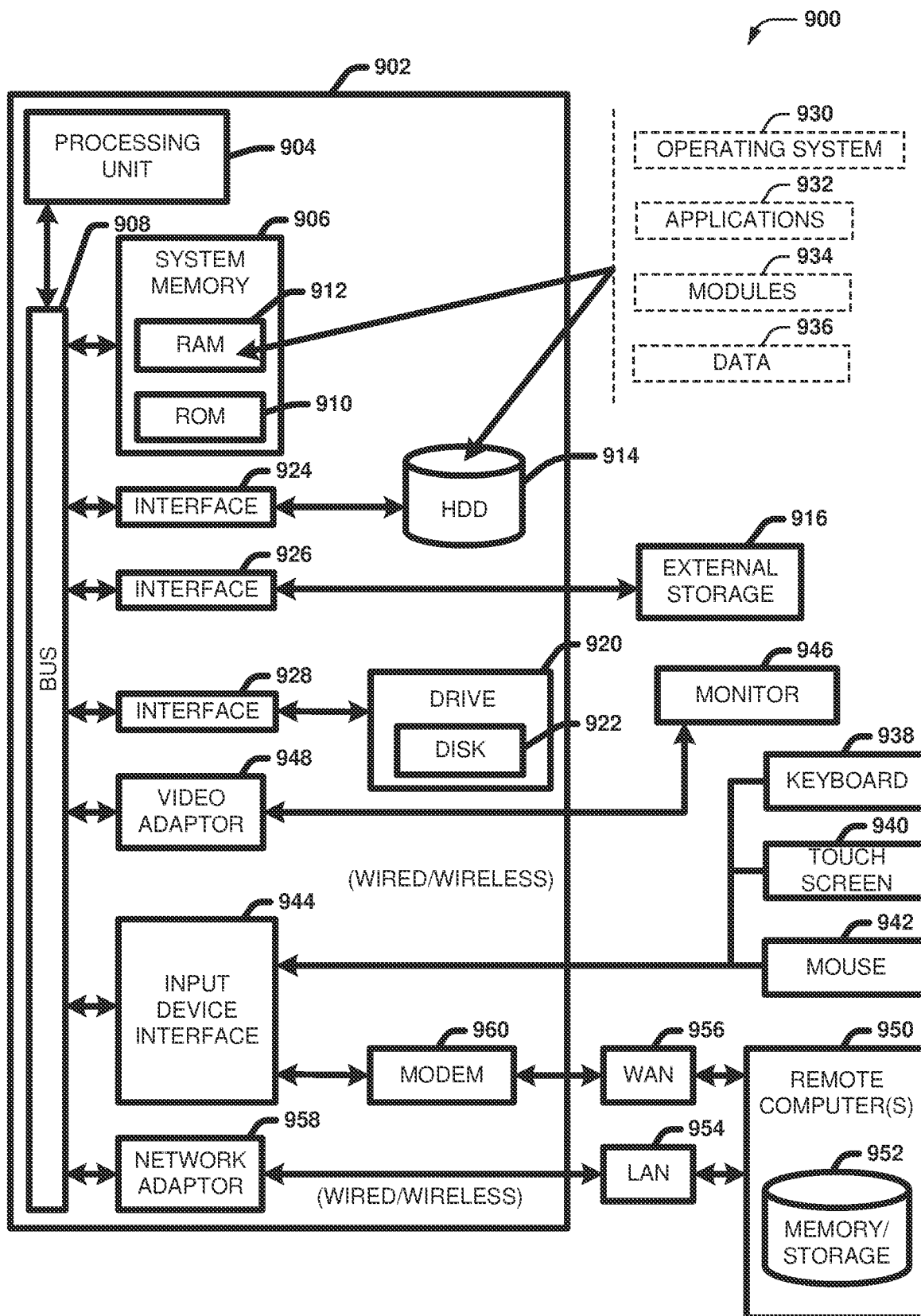
FIG. 9 illustrates a block diagram of an example, non-limiting operating environment in which one or more embodiments described herein can be facilitated.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and a drive 920, e.g., such as a solid state drive, an optical disk drive, which can read or write from a disk 922, such as a CD-ROM disc, a DVD, a BD, etc. Alternatively, where a solid state drive is involved, disk 922 would not be included, unless separate. While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and drive 920 can be connected to the system bus 908 by an HDD interface 924, an external storage interface 926 and a drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above, such as but not limited to a network virtual machine providing one or more aspects of storage or processing of information. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with an existing network or simply an ad hoc communication between at least two devices.

Figure 10:
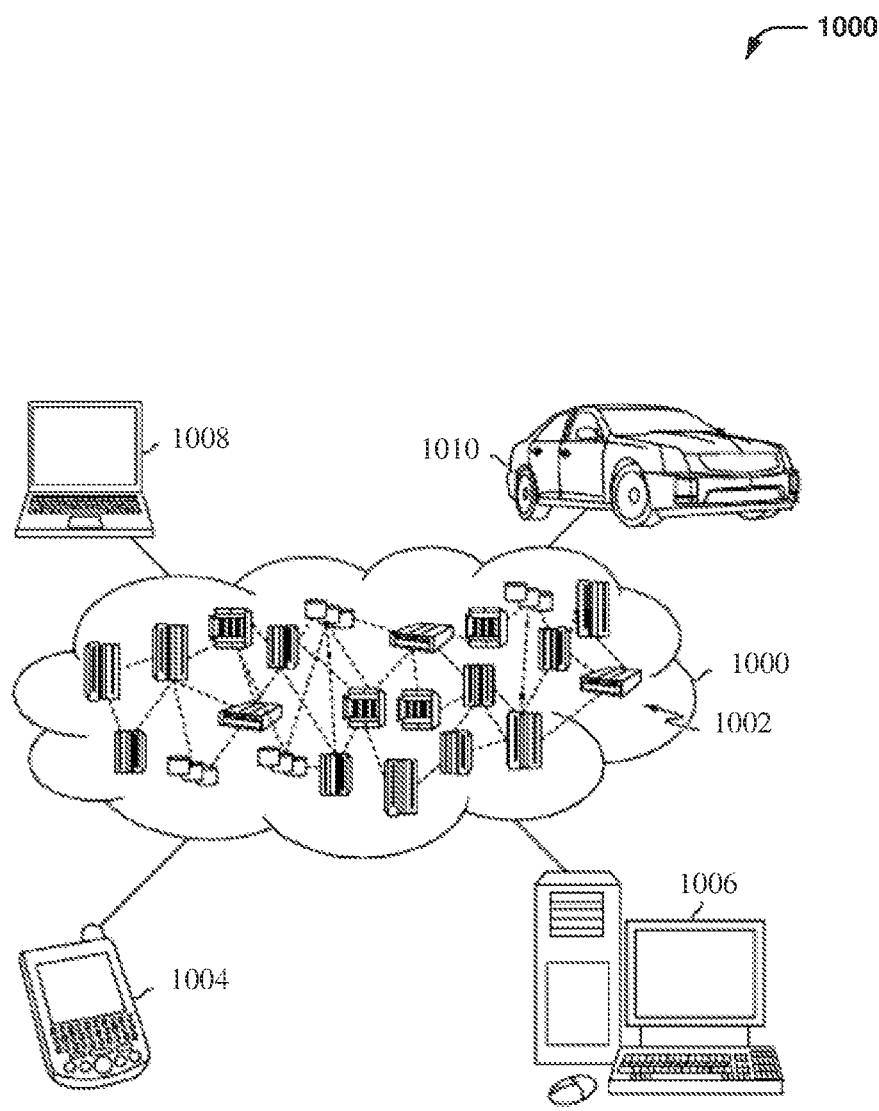
FIG. 10 illustrates an example, non-limiting cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
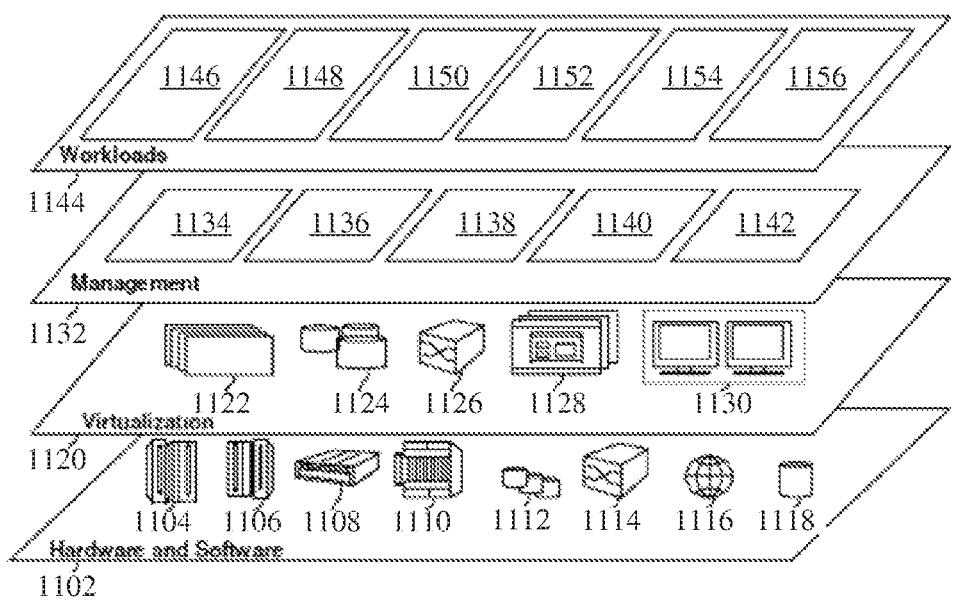
FIG. 11 illustrates example, non-limiting abstraction model layers in accordance with one or more embodiments described herein.

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and differentially private federated learning processing 1156. Various embodiments of the present invention can utilize the cloud computing environment described with reference to FIGS. 10 and 11 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable components stored in a computer-readable memory, the computer-executable components comprising:
a backend receiver component that receives, from a client device, user input comprising one or more input parameters and a computer program, wherein the computer program is configured to indicate a quantum computation, and the one or more input parameters specify one or more software libraries needed by the computer program for execution, and specify initial ansatz parameters for use in the quantum computation; and
a backend runtime manager component that hosts the computer program by instantiating a runtime container on a backend classical computing device, wherein the runtime container:
downloads, to the backend classical computing device, based on the one or more input parameters, one or more software libraries needed by the computer program,
instructs a backend quantum computing device to initialize qubits into a defined quantum state for the quantum computation, and
orchestrates both classical execution of the computer program on the backend classical computing device using the one or more software libraries, and quantum execution of the quantum computation indicated by the computer program on the qubits of the backend quantum computing device using the initial ansatz parameters.

2. The system of claim 1, wherein the backend quantum computing device that, in response to an instruction from the runtime container, executes the quantum computation indicated by the computer program.

3. The system of claim 2, wherein, during execution by the backend classical computing device, the computer program utilizes quantum results generated by the at least one backend quantum computing device, thereby yielding program results.

4. The system of claim 3, wherein the computer-executable components further comprise:
a backend recording component that records the quantum results or the program results.

5. The system of claim 1, wherein the backend classical computing device and the backend quantum computing device are collocated, or wherein the backend classical computing device and the backend quantum computing device are coupled via a dedicated communication channel.

6. The system of claim 1, wherein the backend runtime manager component mediates communication between the client device and the computer program.

7. The system of claim 1, wherein the backend receiver component accesses another computer program provided by another client device, wherein the other computer program is configured to indicate another quantum computation, wherein the backend runtime manager component hosts the another computer program by instantiating another runtime container on the backend classical computing device, wherein the other runtime container orchestrates both classical execution of the other computer program and quantum execution of the other quantum computation indicated by the other computer program, and wherein the other runtime container operates in parallel with the runtime container.

8. A computer-implemented method, comprising:
receiving, by a backend device operatively coupled to a processor, from a client device, user input comprising one or more input parameters and a computer program, wherein the computer program is configured to indicate a quantum computation, and the one or more input parameters specify one or more software libraries needed by the computer program for execution, and specify initial ansatz parameters for use in the quantum computation; and
hosting, by the backend device, the computer program by instantiating a runtime container on a backend classical computing device, wherein the runtime container:
downloads, to the backend classical computing device, based on the one or more input parameters, one or more software libraries needed by the computer program,
instructs a backend quantum computing device to initialize qubits into a defined quantum state for the quantum computation, and
orchestrates both classical execution of the computer program on the backend classical computing device using the one or more software libraries, and quantum execution of the quantum computation indicated by the computer program on the qubits of the backend quantum computing device using the initial ansatz parameters.

9. The computer-implemented method of claim 8, further comprising:
   executing, by the backend device and in response to an instruction from the runtime container, the quantum computation on the backend quantum computing device.

10. The computer-implemented method of claim 9, wherein, during execution by the backend classical computing device, the computer program utilizes quantum results generated by the at least one backend quantum computing device, thereby yielding program results.

11. The computer-implemented method of claim 10, further comprising:
   recording, by the backend device, the quantum results or the program results.

12. The computer-implemented method of claim 8, wherein the backend classical computing device and the a backend quantum computing device are collocated, or wherein the backend classical computing device and the backend quantum computing device are coupled via a dedicated communication channel.

13. The computer-implemented method of claim 8, wherein the runtime container mediates communication between the client device and the computer program.

14. The computer-implemented method of claim 8, further comprising:
   accessing, by the backend device, another computer program provided by another client device, wherein the other computer program is configured to indicate another quantum computation; and
   hosting, by the backend device, the other computer program by instantiating another runtime container on the backend classical computing device, wherein the other runtime container orchestrates both classical execution of the other computer program and quantum execution of the other quantum computation indicated by the other computer program, and wherein the other runtime container operates in parallel with the runtime container.

15. A computer program product for facilitating backend quantum runtimes, the computer program product comprising a computer-readable memory having program instructions embodied therewith, the program instructions executable by a backend processor to cause the backend processor to:
   receive, by the backend processor, from a client device, user input comprising one or more input parameters and a computer program provided by a client device, wherein the computer program is configured to indicate a quantum computation, and the one or more input parameters specify one or more software libraries needed by the computer program for execution, and specify initial ansatz parameters for use in the quantum computation; and
   host, by the backend processor, the computer program by instantiating a runtime container on a backend classical computing device, wherein the runtime container:
      downloads, to the backend classical computing device, based on the one or more input parameters, one or more software libraries needed by the computer program,
      instructs a backend quantum computing device to initialize qubits into a defined quantum state for the quantum computation, and
   orchestrates both classical execution of the computer program on the backend classical computing device using the one or more software libraries, and quantum execution of the quantum computation indicated by the computer program on the qubits of the backend quantum computing device using the initial ansatz parameters.

16. The computer program product of claim 15, wherein the program instructions are further executable to cause the backend processor to:
   execute, by the backend processor and in response to an instruction from the runtime container, the quantum computation on the backend quantum computing device.

17. The computer program product of claim 16, wherein, during execution by the backend classical computing device, the computer program utilizes quantum results generated by the at least one backend quantum computing device, thereby yielding program results.

18. The computer program product of claim 17, wherein the program instructions are further executable to cause the backend processor to:
   record, by the backend processor, the quantum results or the program results.

19. The computer program product of claim 15, wherein the backend classical computing device and the backend quantum computing device are collocated, or wherein the backend classical computing device and the backend quantum computing device are coupled via a dedicated communication channel.

20. The computer program product of claim 15, wherein the runtime manager component mediates communication between the client device and the computer program.

* * * * *